(12) United States Patent
Karlsson et al.

(10) Patent No.: US 12,358,359 B2
(45) Date of Patent: Jul. 15, 2025

(54) STRUCTURAL BATTERY FOR AN ELECTRIC VEHICLE

(71) Applicant: Volvo Car Corporation, Gothenburg (SE)

(72) Inventors: Daniel Karlsson, Gothenburg (SE); Martin Hjälm Wallborg, Harestad (SE); Simone Vizzini, Gothenburg (SE); Klas Persson, Kungälv (SE)

(73) Assignee: Volvo Car Corporation, Gothenburg (SE)

( * ) Notice: Subject to any disclaimer, the term of this patent is extended or adjusted under 35 U.S.C. 154(b) by 298 days.

(21) Appl. No.: 17/861,512

(22) Filed: Jul. 11, 2022

(65) Prior Publication Data

US 2023/0026490 A1 Jan. 26, 2023

(30) Foreign Application Priority Data

Jul. 16, 2021 (EP) ...................................... 21186239

(51) Int. Cl.
*B60K 1/04* (2019.01)
(52) U.S. Cl.
CPC ........ *B60K 1/04* (2013.01); *B60K 2001/0438* (2013.01)
(58) Field of Classification Search
CPC ........................... B60K 1/04; B60K 2001/0438
See application file for complete search history.

(56) References Cited

U.S. PATENT DOCUMENTS 9,033,085 B1 * 5/2015 Rawlinson ............... B60K 1/04
180/68.5
2009/0145676 A1 6/2009 Takasaki et al.

FOREIGN PATENT DOCUMENTS

DE 102019118392 A1 5/2020
DE 102018133006 A1 * 6/2020

OTHER PUBLICATIONS

Dec. 21, 2021 European Search Report issued in International Application No. 21186239.
Westbrook, The Porsche Taycan was Designed with Something Called 'Foot Garages', Jul. 2, 2019, https://jalopnik.com/the-porsche-taycan-was-designed-with-something-called-f-1836023684, whole document.

* cited by examiner

*Primary Examiner* — Jason D Shanske
*Assistant Examiner* — James J Triggs
(74) *Attorney, Agent, or Firm* — Clements Bernard Walker; Christopher L. Bernard (57) ABSTRACT

A bottom structure for an electric vehicle including at least a first and second beam-shaped battery modules extending in a length direction. Each module is formed by a number interconnected cells and has two longitudinal sides, two transverse sides and a top side covered by a cover plate. The modules are mutually interconnected along their longitudinal sides via an adhesive.

13 Claims, 8 Drawing Sheets

STRUCTURAL BATTERY FOR AN ELECTRIC VEHICLE

CROSS-REFERENCE TO RELATED APPLICATION

The present disclosure claims the benefit of priority of co-pending European Patent Application No. 21186239.6, filed on Jul. 16, 2021, and entitled "Structural Battery for an Electric Vehicle," the contents of which are incorporated in full by reference herein.

TECHNICAL FIELD

The present disclosure relates to a bottom structure for an electric vehicle including a first and second beam-shaped battery module, each module formed by a number interconnected cells and having two longitudinal sides, two transverse sides and a top side.

The present disclosure also relates to a battery assembly for use in an electric vehicle, an electric vehicle including such a battery assembly and to a method of manufacturing.

BACKGROUND

Electrical vehicles (also known as Battery Electric Vehicles, BEV in short) use a battery pack to provide electricity to the drive train/motor(s). To provide enough range with current cell technology, in line with customer expectations coming from a fossil fuel car, a BEV battery is located underneath the passenger compartment, basically under the floor. The overall design complexity involves maximizing cell volume (range) into a given footprint (area/volume) provided by the car setup, to the lowest weight possible (range/environmental impact) while also maximizing highly important attributes such as crash safety and vehicle stiffness (NVH and driver experience).

Up until recently, a battery electric vehicle pack has been as a standalone unit with a main function being a safety cage for battery cells and modules, preventing intrusion that causes catastrophic failure, while also protecting the sensitive electronics inside the pack from the outside environment. This thinking has led to double structures, battery and body of the vehicle. Having double structures with the necessary gaps to allow for tolerances and general assembly, occupies a volume that could have otherwise been used for integrating more cell volume, further increasing range, had the two systems been seen and engineered as one system. Current art is compensating for this lower volumetric efficiency by using a larger footprint, leading to a shorter stopping distance (in longitudinal and lateral direction) between frame structure and cell footprint. An increasing size of the vehicle results in in increased energy content.

It is known to provide a structural battery in which the battery casing forms the bottom of the vehicle body and the traditional front floor is removed. The arrays of battery cells are kept in place inside a protective casing by means of a resin.

Other known technology involves a sliding arrangement of the battery modules in a transverse direction, between a top plate and bottom plate for easy exchange. The center parts of the known battery modules between the side support structure form the bottom of the vehicle and results in a stiff construction of high strength and has a high resistance to front, rear and side impacts.

It is an object of the present disclosure to provide a bottom structure for an electric vehicle having a battery pack with an improved volumetric efficiency and forming a structural part of the vehicle body. It is another object of the present disclosure to provide a relatively narrow structural battery pack having a longer stopping distance for side impacts, resulting in a more light weight bottom structure. The present disclosure aims at providing a bottom structure that has a high load capability for frontal load cases and having an increased critical buckling load.

SUMMARY

The present disclosure provides a bottom structure for an electric vehicle including at least a first and second beam-shaped battery module extending in a length direction, each module being formed by a number interconnected cells and having two longitudinal sides, two transverse sides and a top side covered by a cover plate, the modules being interconnected along their longitudinal sides via an adhesive.

Adhesive connection the beam shaped battery modules results in a compact construction and gives strong impact resistance in the length direction that significantly increases the critical buckling load. The longitudinally interconnected of the battery modules provide a stiff core with a high torsional stiffness, facilitating weight saving of other structural parts of the vehicle.

The cover plate of the battery modules can be adhesively connected to the battery cells and may include cooling channels extending in the length direction.

The modules of the bottom structure may be adhesively interconnected with their longitudinal sides via a longitudinal strip-shaped interconnecting member that extends with an upper edge above a plane of the cover plate and having a transverse upper flange that is connected to a top plate.

The adhesive connection of the vertical short sides of the cells acts as a thermal insulator between the battery cells and the interconnecting members, so that uncontrolled heat transfer from the battery cells to environment is reduced.

The interconnecting members may extend with a lower edge below a bottom plane of the battery cells and can have a transverse lower flange that is connected to a bottom plate. The interconnected battery modules are encased between the top and bottom plates, which may be formed of aluminum, to form a strong and stiff sandwich structure that increases the torsional stiffness of the vehicle while being of a relatively low weight. Preferably the top and bottom plates are spaced at a distance from the cover and from the bottom surfaces of the of the battery modules to prevent uncontrolled upward and downward heat transfer between the battery modules and the cabin and environment.

The bottom plate may be provided with cooling channels transporting a cooling medium.

The interconnecting members may include profiled metal strips or extruded hollow members, and may be provided with open areas for weight saving.

In an embodiment of a bottom structure, two pairs of adhesively interconnected battery modules are adhesively interconnected via a longitudinal center profile, providing an integral battery pack accommodating four or more battery modules containing between 100 and 200 cells, while having a reduced transverse dimension.

The longitudinal interconnecting members and the center profile may extend in a length direction with an end part extending beyond the transverse sides of the battery modules, and can be provided at the end part with a connector bracket that attaches to a rear and/or a front transverse beam of a battery frame.

The front transverse beam can be connected to the front sub frame, the battery modules forming the stiff bottom part of the vehicle and supporting the passenger cabin.

The front and rear transverse beams can be connected to longitudinal side profiles of the battery frame, extending at a distance from the longitudinal sides of outer battery modules. The transverse distance between the longitudinal side profiles and the periphery of the battery modules provides an optimal balance between volumetric efficiency and stopping distance on side impact.

In an embodiment, the longitudinal side profiles are interconnected by one or more cross beams, the side profiles and the cross beam extending above a plane of the top plate. The cross beams support the front passenger seats and may bound a foot garage in a rearward and/or forward cabin part.

A method of forming a bottom structure for an electric vehicle includes:
  forming at least two beam-shaped battery modules by interconnecting a number of battery cells and attaching a cooling plate over a top surface of the interconnected cells, the modules having two longitudinal sides, two transverse sides, a top surface and a bottom surface,
  adhesively interconnecting two or more battery modules along their longitudinal sides,
  providing a tray formed by two longitudinal profiles interconnected by a front and a rear transverse beam,
  placing the battery modules into the tray and connecting the modules to the front and rear transverse beams, and
  connecting a top plate and a bottom plate to the battery modules and to the longitudinal profiles.

BRIEF DESCRIPTION OF THE DRAWINGS

Embodiments of a bottom structure and a battery pack according to the present disclosure will, by way of non-limiting example, be discussed in detail with reference to the accompanying drawings. In the drawings.

DESCRIPTION OF EMBODIMENTS

Figure 1:
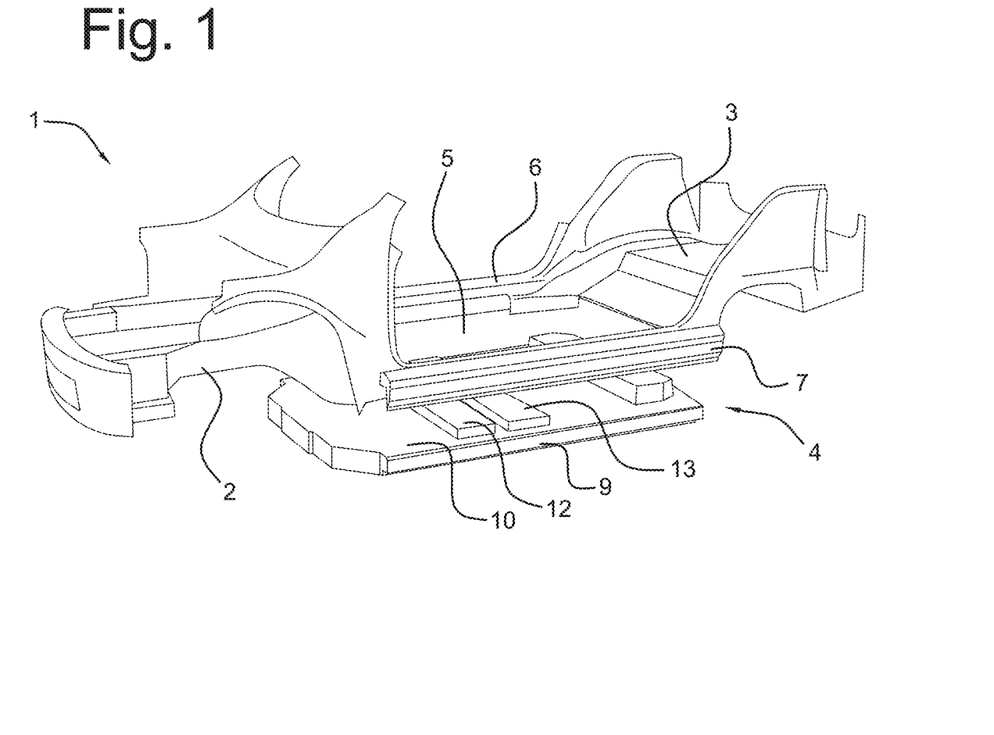
FIG. 1 shows a perspective view of a structure of an electric vehicle.

FIG. 1 shows a frame 1 of an electric vehicle including a front frame structure 2, a rear frame structure 3, including a rear floor, and a structural battery assembly 4 forming a bottom structure 5. The structural battery assembly includes longitudinal side profiles 6,7 interconnecting the front and rear frame structures 2,3 and supporting a battery pack 9 of interconnected battery modules. Cross beams 12,13 are connected, for instance via spot welding, to a top plate 10 of the battery pack 9 and extend in a transverse direction, interconnecting the side profiles 6,7.

Figure 2:
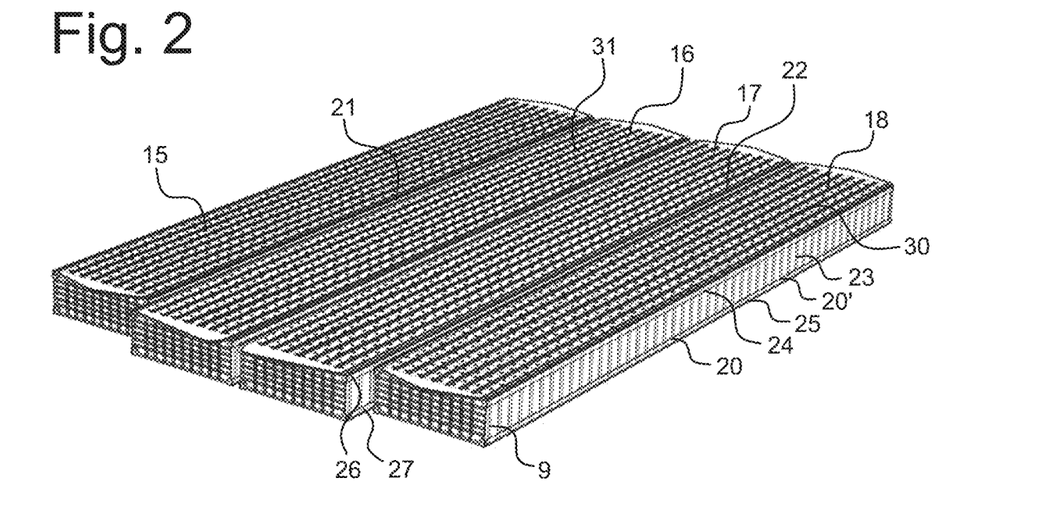
FIG. 2 shows an assembly of adhesively interconnected battery modules according to the present disclosure in an expanded view.

FIG. 2 shows four interconnected battery modules 15,16, 17,18 in an expanded view. Each module includes a number of interconnected battery cells 19,20,20' (see FIG. 3) that are covered by a cover plate 30, 31. The modules 15,16,17,18 are interconnected along their longitudinal sides 21,22,23 via strips of adhesive 24,25,26,27.

Figure 3:
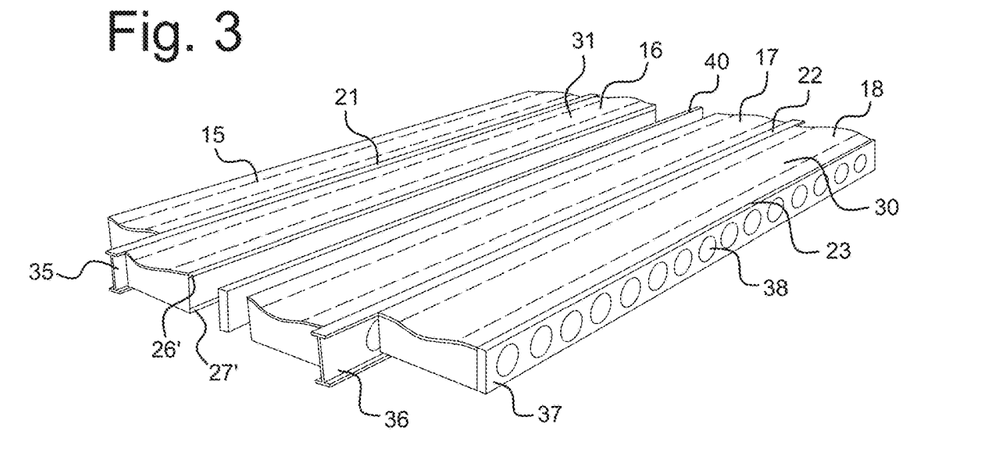
FIG. 3 shows the assembly of FIG. 2 in an assembled state.

FIG. 3 shows that along the longitudinal sides 21,22 of the battery modules 15,16,17,18 interconnecting members 35,36 are provided, to which the adhesive is applied. A side member 37 is adhesively attached to the outermost module 18. An extruded hollow center profile 40 is on each side adhesively connected to two modules 15,16; 17,18. The interconnecting members 35,36 and the side member 37 may be provided with an open structure having cut outs 38 forming a cellular beam, for weight reduction. Instead of an I-beam with punched holes, a closed side member of heavier construction is used for increased strength and secure containing the heavy battery cells, which may have a weight of 450 kg or more.

Figure 4:
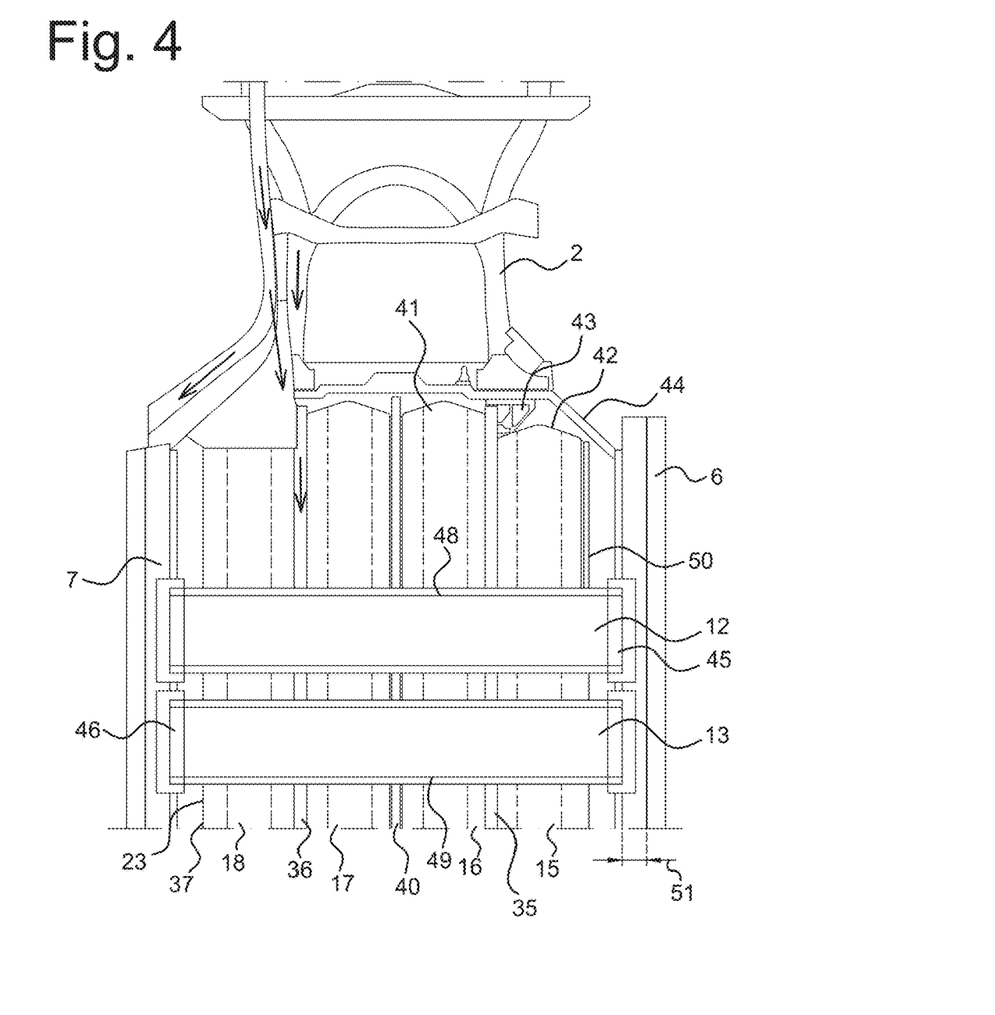
FIG. 4 shows a top plan view of a bottom frame structure and a front frame structure.

FIG. 4 shows the interconnecting members 35,36 at the front transverse sides 41,42 of the battery modules 15,16; 17, 18 being connected to a front transverse beam 44 via a bracket 43. The front transverse beam 44 is connected to the longitudinal side profiles 6,7. The cross beams 12, 13 are connected to the side profiles 6,7 through brackets 45, 46 and spot welding onto the top surface of the battery modules 15,16,17,18 through spot welding 48,49.

The arrows indicate the forces that act during a frontal impact, being transferred to the interconnecting members 35, 36 and to the center profile 40 that provide increased resistance in the longitudinal direction against buckling. A clearance 51 between the longitudinal sides 23, 50 of the battery modules and the longitudinal profiles 6, 7 provides an increase in stopping length on side impact.

Figure 5:
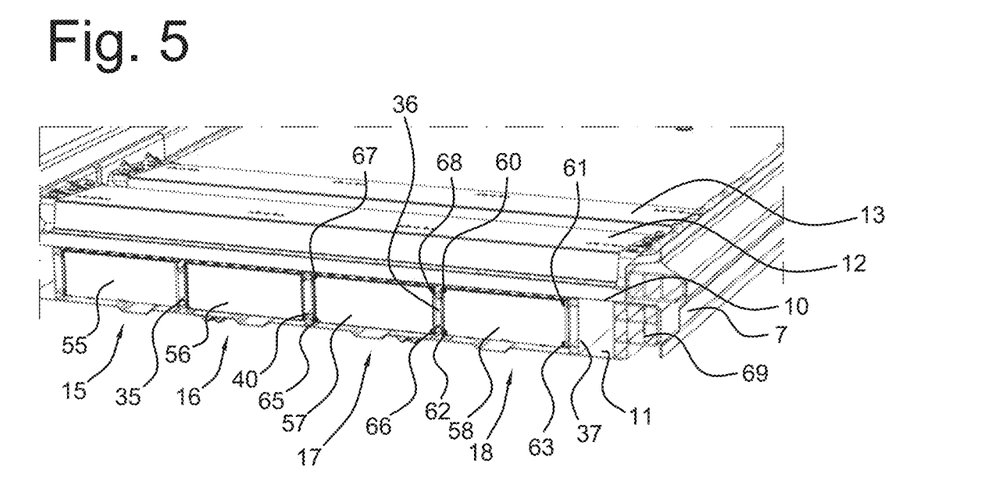
FIG. 5 shows a perspective transverse cross-sectional view of a bottom frame structure, looking in a rearward direction.

FIG. 5 shows a transverse cross sectional view of the battery modules 15,16,17,18, showing battery cells 55,56, 57,58. The cell 58 is connected via adhesive connections 60,61,62,63 to interconnecting member 36 and side member 37. The cell 57 is connected to the center profile 40 and to the interconnecting member 36 via adhesive connections 65-68. The battery cells 55,56,57,58 are situated between the top plate 10 and bottom plate 11, that are connected to the center profile 40 and to the interconnecting members 35,36 and side profile 37 at a distance from the top surface and from the bottom surface of the battery cells 55,56,57,58. The top and bottom plates 10,11 are provided at their longitudinal sides with reinforcement structures 69 and are attached to the side profiles 6,7.

Figure 6:
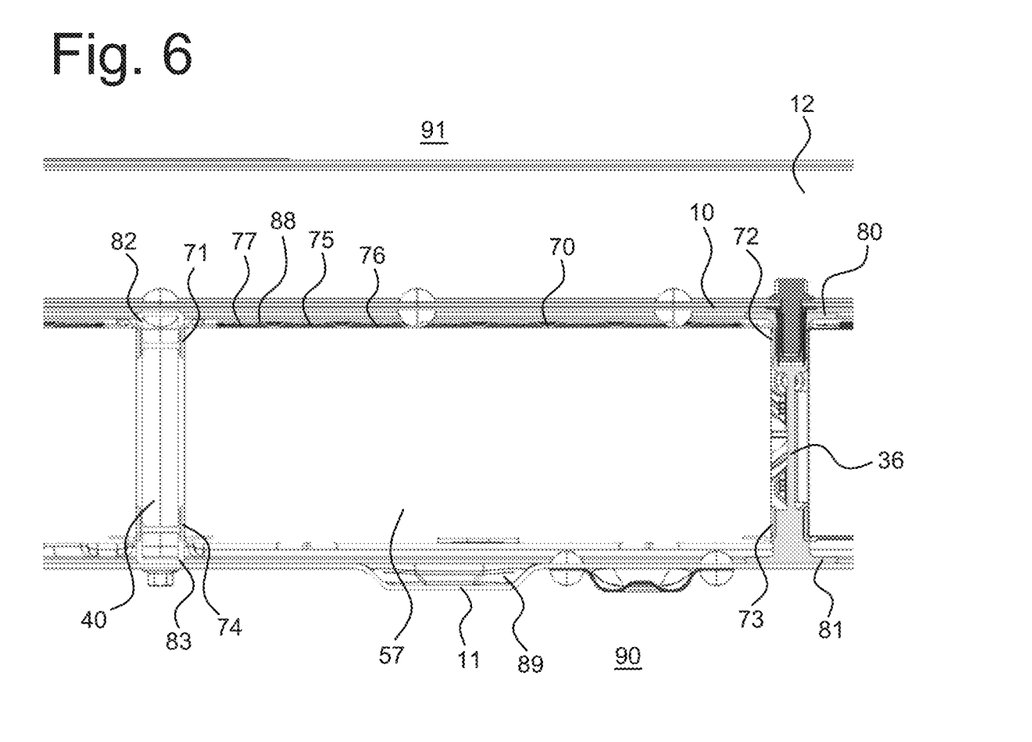
FIG. 6 shows an enlarged detail of the cross-sectional view of FIG. 5, FIGS. 7a and 7b show a foot garage situated adjacent a battery pack according to the present disclosure.

FIG. 6 shows a battery cell 57, being connected in areas 71,72,73 and 74 via an adhesive, to the interconnecting member 36 and to the central profile 40. The cooling plate 75 is placed on the top surface 74 of the cells 57 and forms cooling channels 76,77 extending the length direction. The interconnecting member 36 is provided with an upper transverse flange 80 and a lower transverse flange 81 that are situated at a distance above the upper plane 70 of the cells 57 and below the lower plane of the cells, respectively. The center profile 40 has upper and lower connecting parts 82,83 extending above and below the upper plane 70 and the lower plane of the cells 57. The top plate 10 is connected to the transverse flange 80 and to the connecting part 82 via mechanical fasteners 84,85, such as drill screws. The bottom plate 11 is connected to the lower transverse flange 81 and the lower connecting part 83 via mechanical fasters. An upper gap 88 and a lower gap 89 are present between the top and bottom plates 10 and 11 and the upper plane 70 of the cells 57 and the lower surface of the cells, so that no uncontrolled heat transfer between the cells and the outside environment 90 and the cabin side 91 can occur.

Figure 7A:
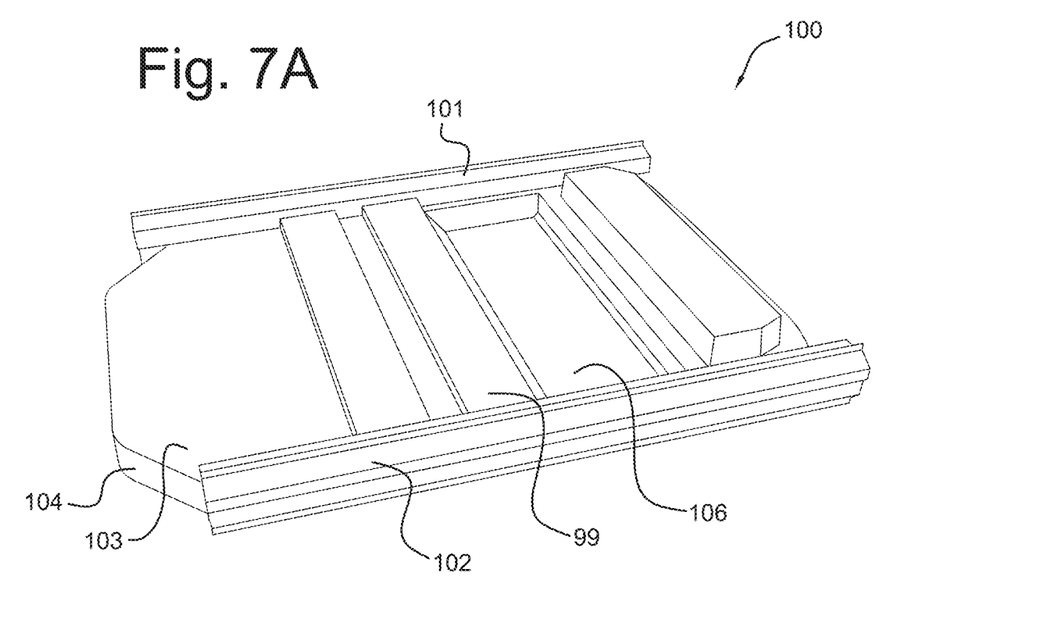
Figure 7B:
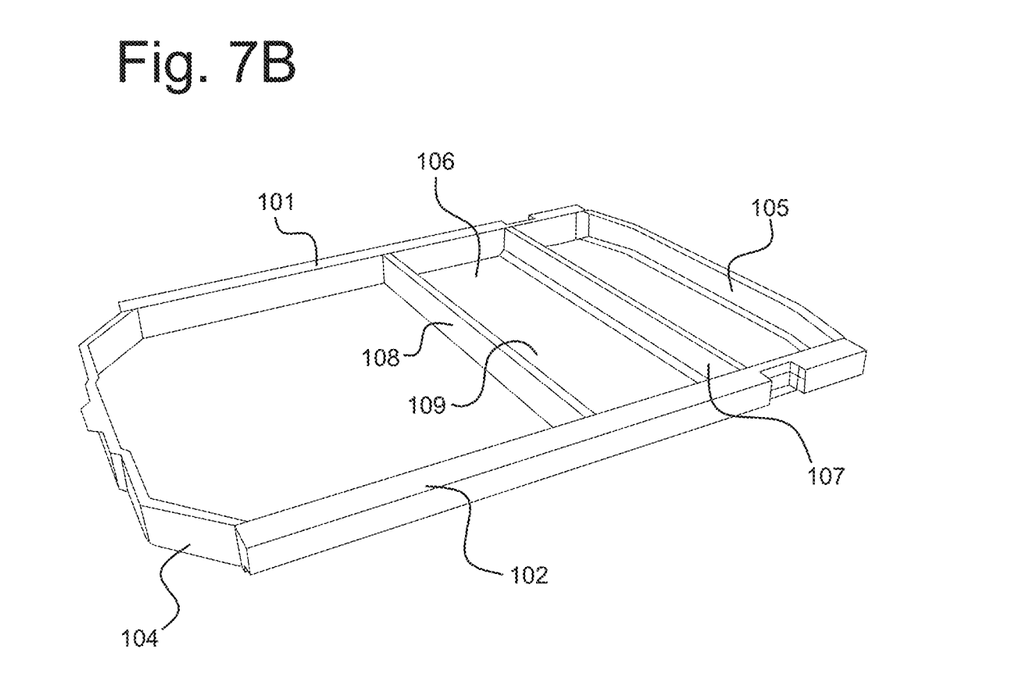

FIG. 7a shows a frame assembly 100 with a battery pack 103, and a foot garage 106 rearward of the cross beam 99 that interconnects the transverse profiles 101,102. FIG. 7b shows that the foot garage 106 is formed of two transverse profiles 107, 108 and a bottom plate 109. The foot garage 106 is of a simple tray design that is highly flexible and scalable and results in a low design of sedan cars.

In order to improve the water tightness of the foot garage, the bottom plate 109 may be formed of the two legs of L-shaped transverse profiles 107,108, which can be formed of extruded aluminum. The legs of the L-shaped profiles can be put in an abutting relation and friction stir welded together to form a tub. This tub can be arc welded in a stich like manner to the longitudinal sill profiles 101,102 to prevent overheating. The small and controlled gap may be sealed. The tub floor can have a section of 10-14 mm height to provide increased strength on side impact.

Figure 8:
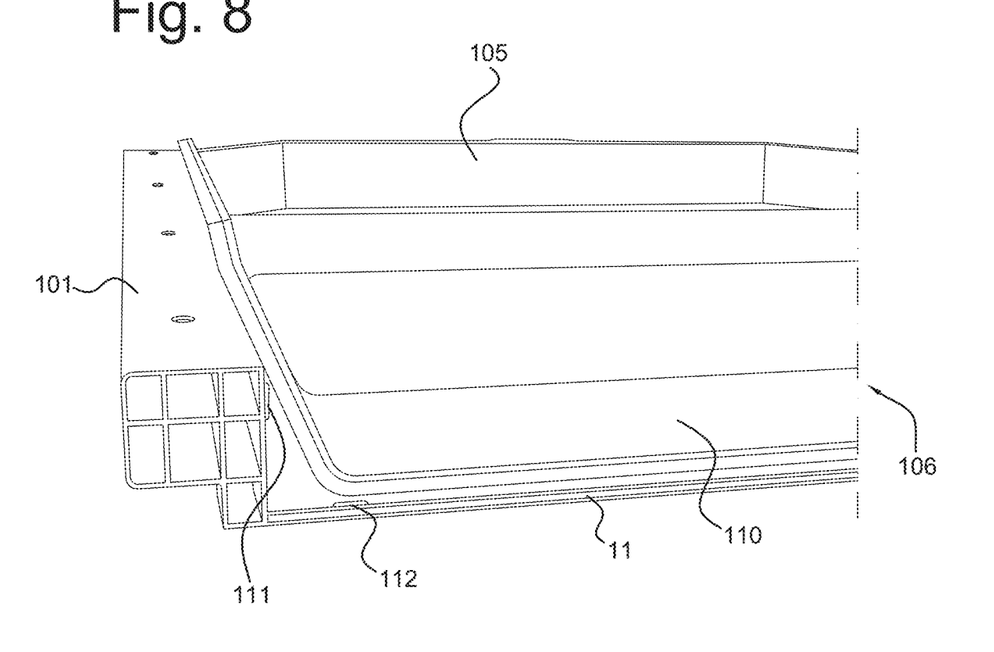
FIG. 8 shows an enlarged detail of a foot garage.
Figure 9A:
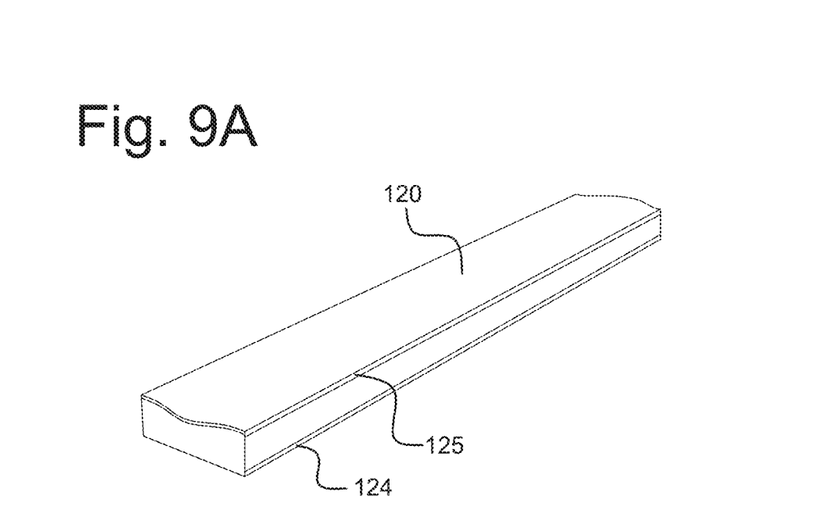
FIGS. 9a-9d show the steps of manufacturing an assembly of adhesively interconnected battery modules.
Figure 9B:
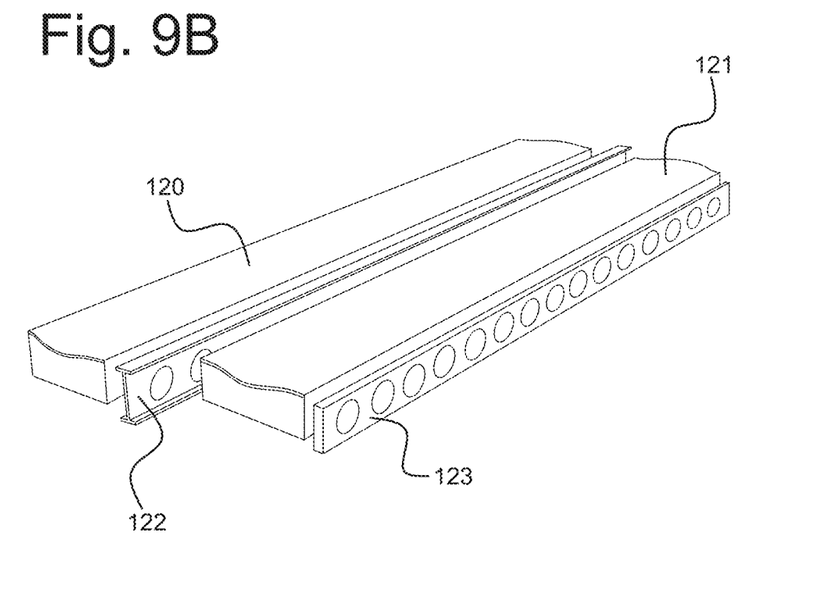
Figure 9C:
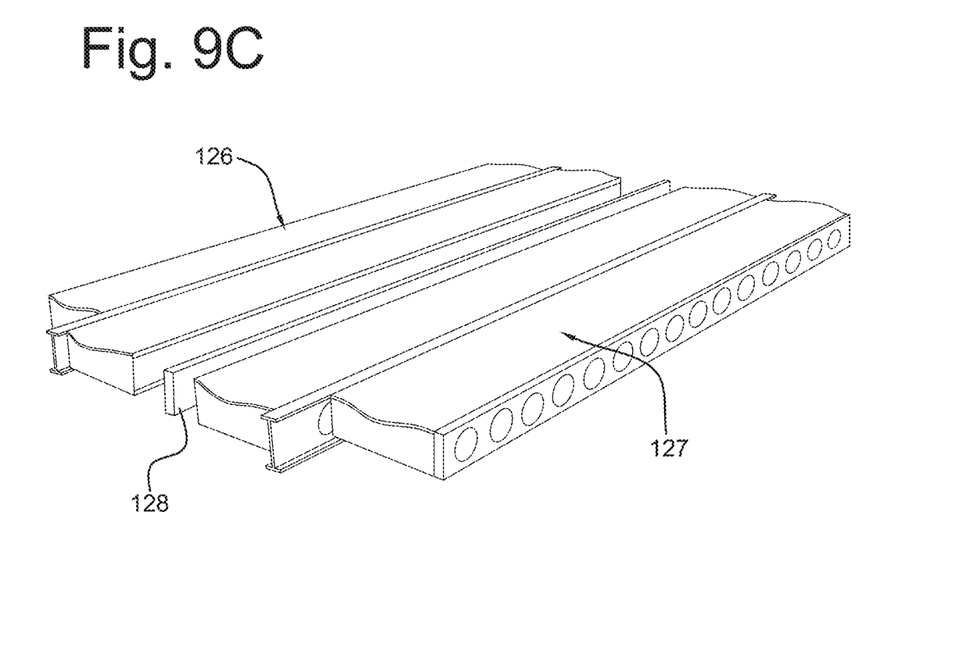
Figure 9D:
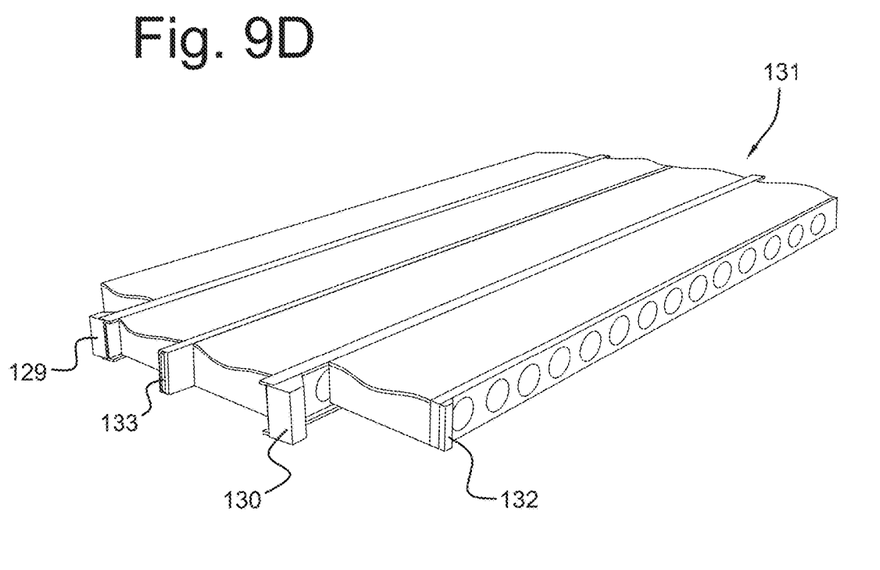

FIG. 8 shows a tray 110 accommodating the foot garage 106, that is with its sidewalls adhesively connected to the longitudinal side profile 101 and to the bottom plate 11 in glue areas 111,112.

FIGS. 9a-9d show the process steps of manufacturing an assembly 131 of adhesively interconnected battery modules at the site of a battery manufacturing plant. In step 9a, adhesive 124, 125 is applied to the longitudinal side of beam-shaped battery module 120. In step 9b, two battery modules 120, 121 are connected to the interconnecting profile 122 and to a side profile 123. The battery modules 120, 121 are held together until the adhesive has cured. In step 9c, two pairs of interconnected battery modules 126, 127 are glued to the center profile 128 and are held together for the adhesive to cure. In step 9d, the assembly 131 is completed by attaching brackets 129, 130,132 and 133 to the interconnecting profiles 122, the side profiles 123 and the center profile 128.

Figure 10A:
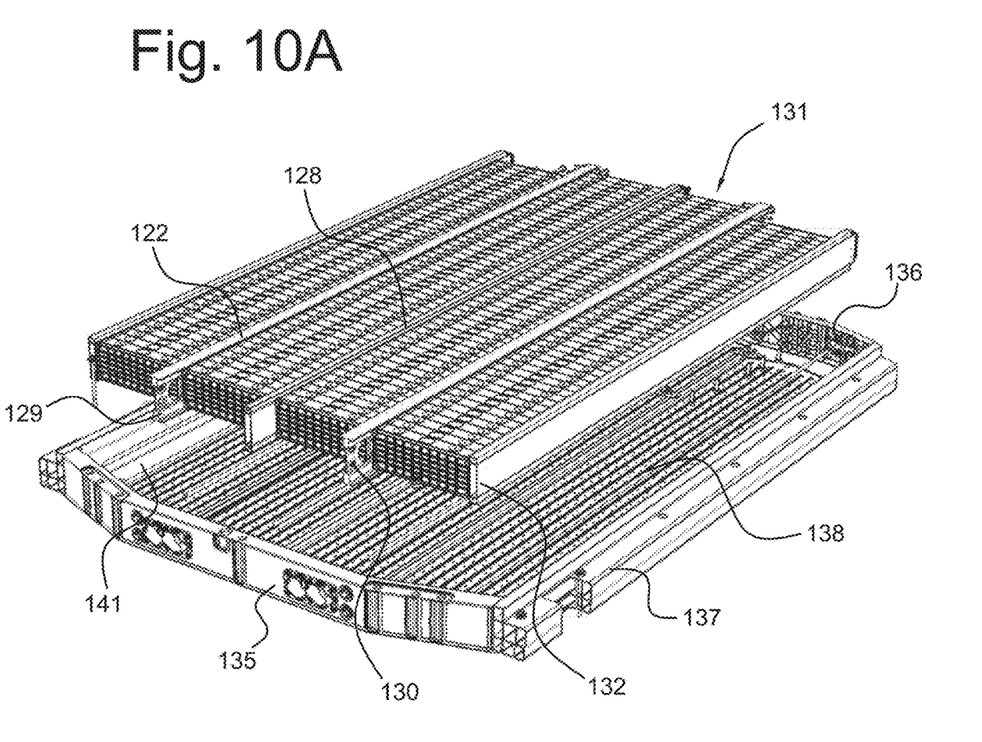
FIGS. 10a and 10b show the completing steps of manufacturing a structural battery pack according the present disclosure.
Figure 10B:
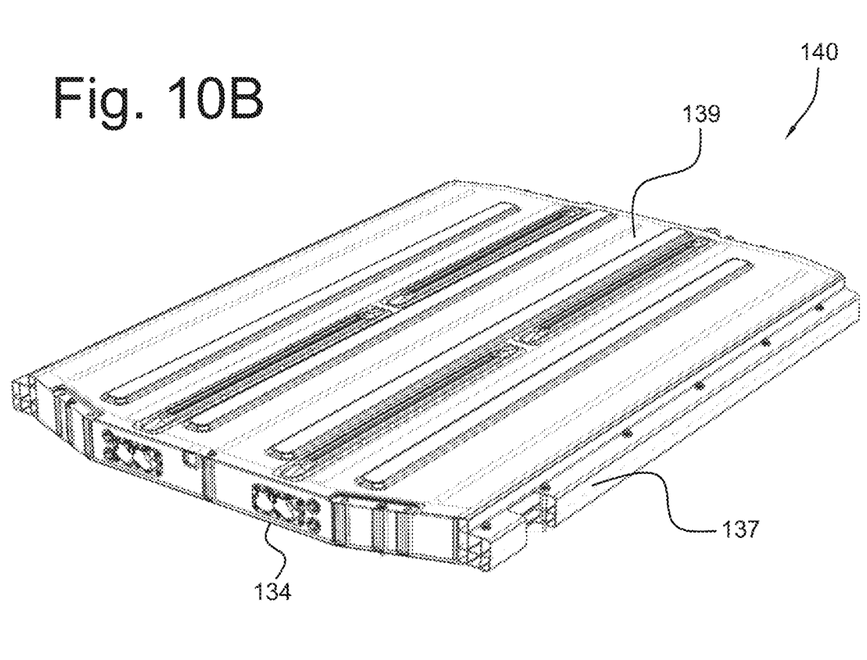

FIG. 10a shows the installation of the module assembly 131 in a tray formed by front and rear transverse beams 135, 136, the longitudinal side profiles 137, 141 and the bottom plate 138. The brackets 129,130,132 on the front and rear side of the assembly 131 are attached to the front and rear transverse beams 135, 136. In step 10c, the battery pack 140 is completed by connection of the top plate 139 to the interconnecting profiles 122, the center profile 128 and the side profiles 137 and providing an under shield layer 134 serving as a bottom protection of the vehicle.

The invention claimed is:

1. A bottom structure for an electric vehicle, the bottom structure comprising at least first and second beam-shaped battery modules extending in a length direction, each module formed by a number of interconnected cells and having two longitudinal sides, two transverse sides and a top side covered by a cover plate, the modules being interconnected along their longitudinal sides via an adhesive,
   wherein the modules are adhesively connected with their longitudinal sides to a longitudinal strip-shaped interconnecting member that extends with an upper edge above the cover plate and having a transverse upper flange member that is connected to a top plate extending over the cover plate of each of the interconnected battery modules.

2. The bottom structure according to claim 1, the cover plate being adhesively connected to the battery cells and comprising cooling channels extending in the length direction.

3. The bottom structure according to claim 1, the longitudinal strip-shaped interconnecting member extending with a lower edge below a bottom plane of the cells and having a transverse lower flange member that is connected to a bottom plate.

4. The bottom structure according to claim 1, two pairs of adhesively interconnected battery modules being adhesively interconnected via a longitudinal center profile.

5. The bottom structure according to claim 1, the longitudinal strip-shaped interconnecting member extending in a length direction with an end part beyond the transverse side of the connected battery module, and being provided at the end part with a connector bracket that attaches to a rear and/or a front transverse beam of a battery frame.

6. The bottom structure according to claim 5, the front and rear transverse beams being connected to longitudinal side profiles of the battery frame, the longitudinal side profiles extending at a distance from the longitudinal perimeter sides of the battery modules.

7. The bottom structure according to claim 6, the side profiles being interconnected by a cross beam, the side profiles and the cross beam extending above a plane of the top plate.

8. The bottom structure according to claim 7, a foot garage being formed near the rear transverse sides of the battery modules and comprising a front beam extending transversely between the longitudinal side profiles at a distance from the cross beam and a bottom plate at the level of the bottom plate.

9. A battery assembly for use in an electric vehicle, the battery assembly comprising first and second beam-shaped battery modules, each module formed by a number interconnected cells and having two longitudinal sides, two transverse sides and a top side comprising a cooling plate, the modules being interconnected along their longitudinal sides via an adhesive,
   wherein the modules are adhesively connected with their longitudinal sides to a longitudinal strip-shaped interconnecting member that extends with an upper edge above the cooling plate and having a transverse upper flange member that is connected to a top plate extending over the cooling plate of each of the interconnected battery modules.

10. The battery assembly according to claim 9, the cooling plate being connected to the battery cells via an adhesive.

11. An electric vehicle comprising the bottom structure according to claim 1.

12. A method of forming a bottom structure for an electric vehicle, the method comprising:
   forming at least two beam-shaped battery modules by interconnecting a number of battery cells and attaching a cooling plate over a top surface of the interconnected cells, the modules having two longitudinal sides, two transverse sides, a top surface and a bottom surface,
   adhesively interconnecting two or more battery modules along their longitudinal sides,
   providing a frame formed by two longitudinal profiles interconnected by a front and a rear transverse beam, placing the battery modules into the frame, and
   connecting a top plate to the battery modules and to the longitudinal profiles.

13. The method according to claim 12, further comprising:

connecting the modules to the front and rear transverse beams, and connecting a a bottom plate to the battery modules and to the longitudinal profiles.

* * * * *